Aug. 16, 1927.
E. H. GROSS
1,639,032
TEMPERATURE CONTROL OF THE AIR CONSTITUENT OF FUEL FOR EXPLOSIVE ENGINES
Filed Jan. 9, 1923   5 Sheets-Sheet 1
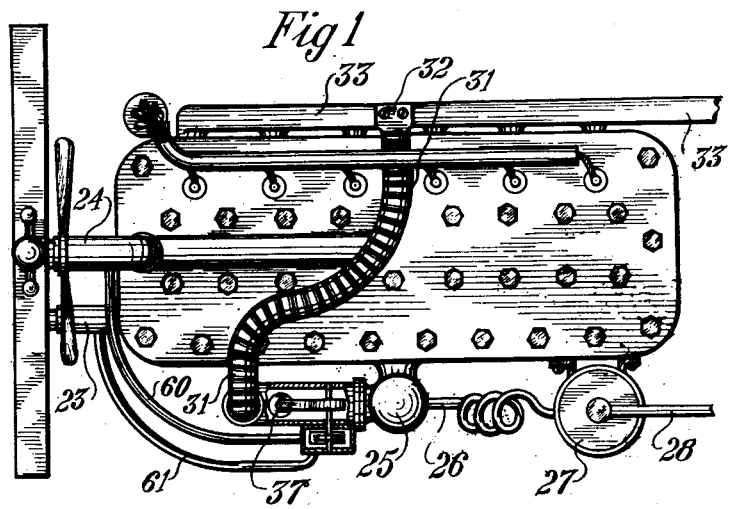
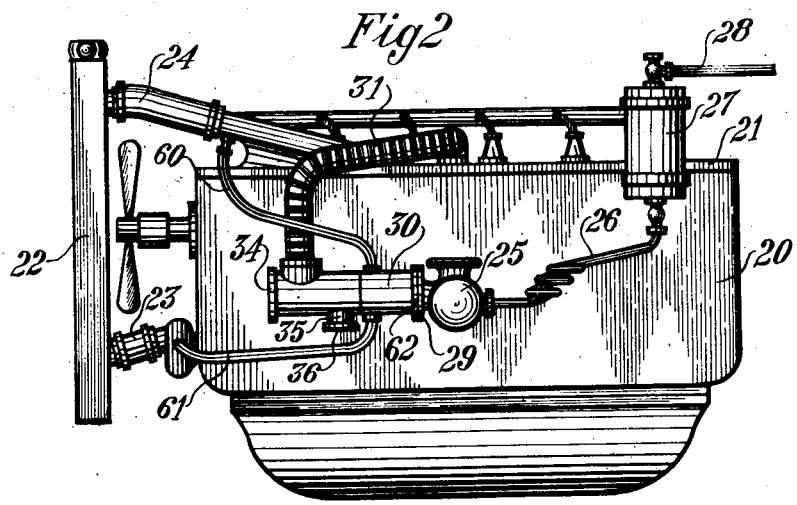

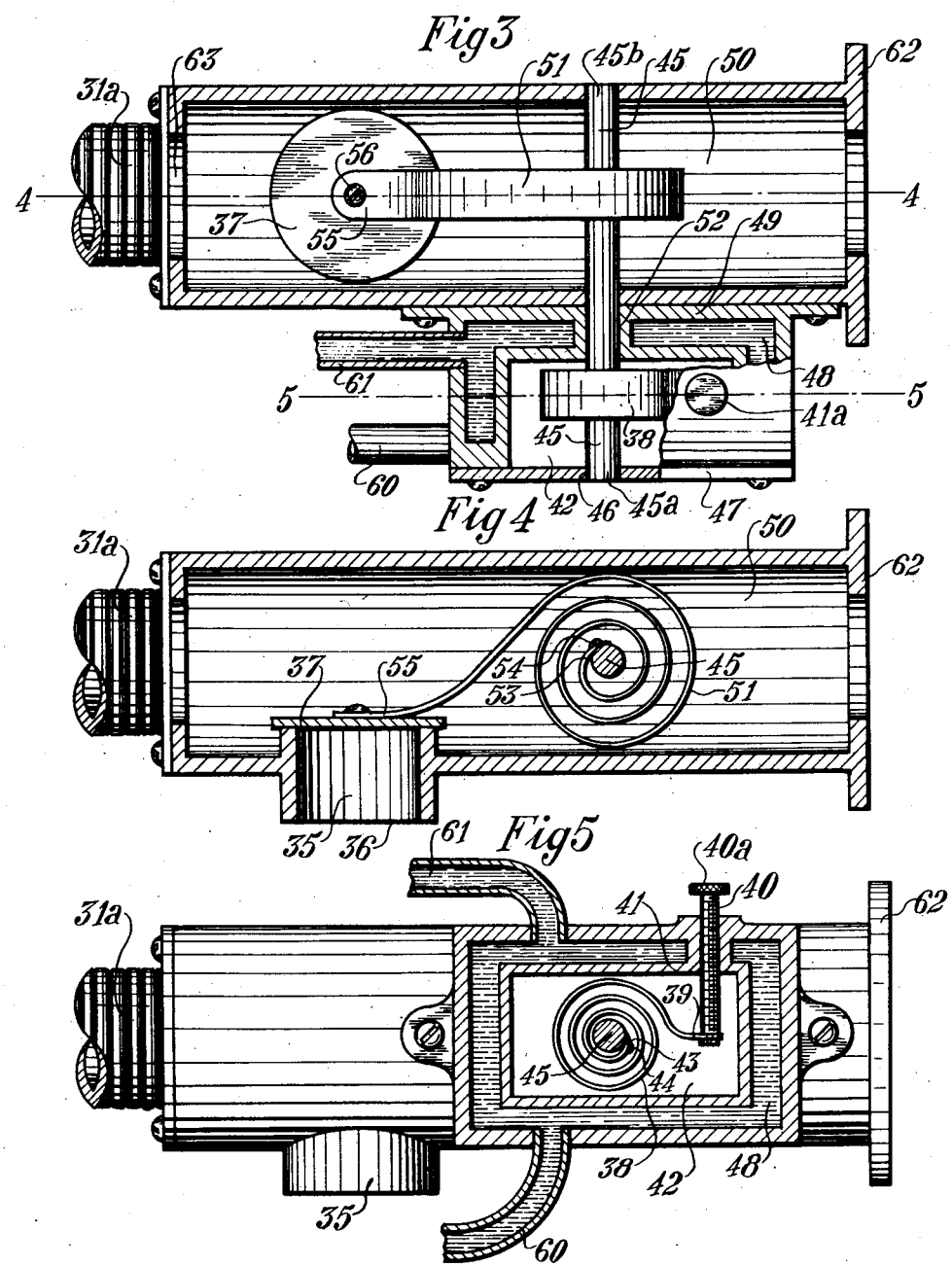

Aug. 16, 1927.  
E. H. GROSS  
1,639,032  
TEMPERATURE CONTROL OF THE AIR CONSTITUENT OF FUEL FOR EXPLOSIVE ENGINES  
Filed Jan. 9, 1923   5 Sheets-Sheet 3
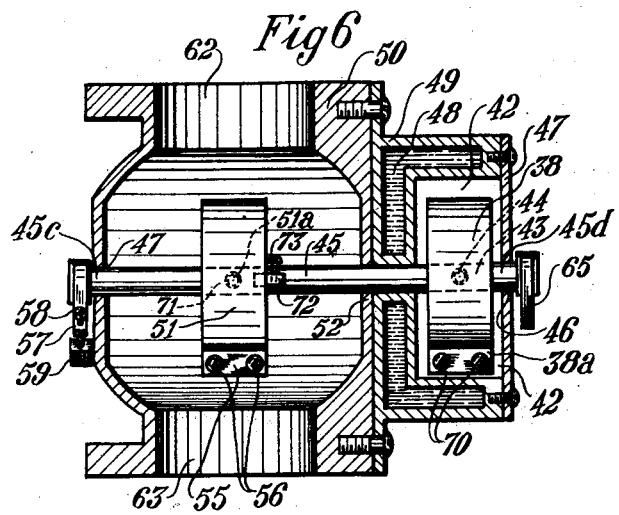
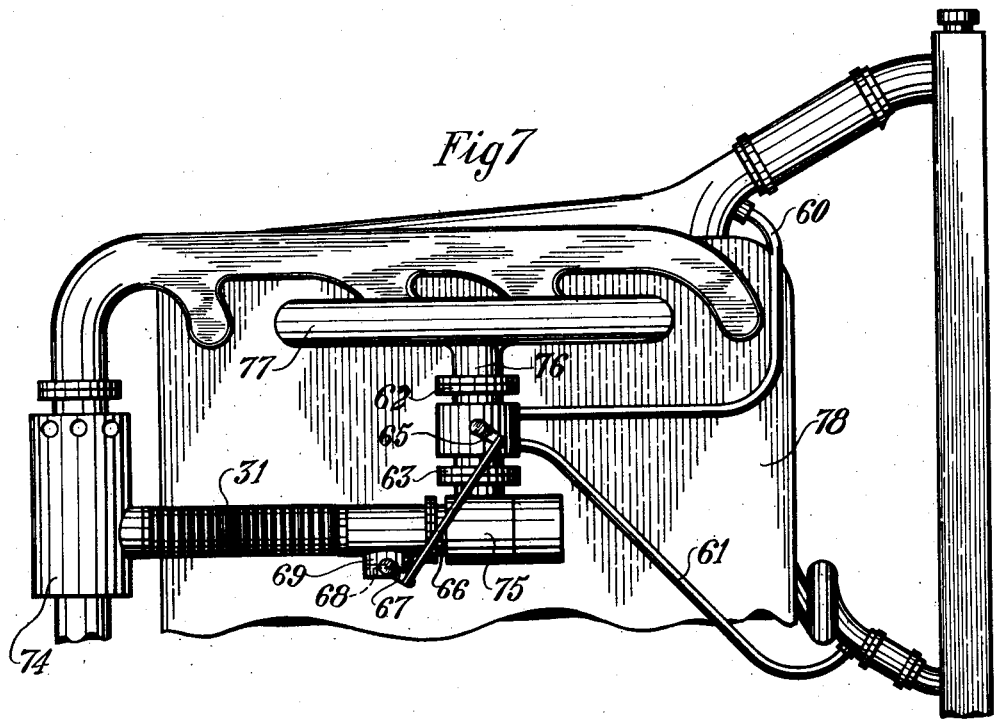
Inventor,
Edward H. Gross,
By his Attorney
Henry J. Lucke.

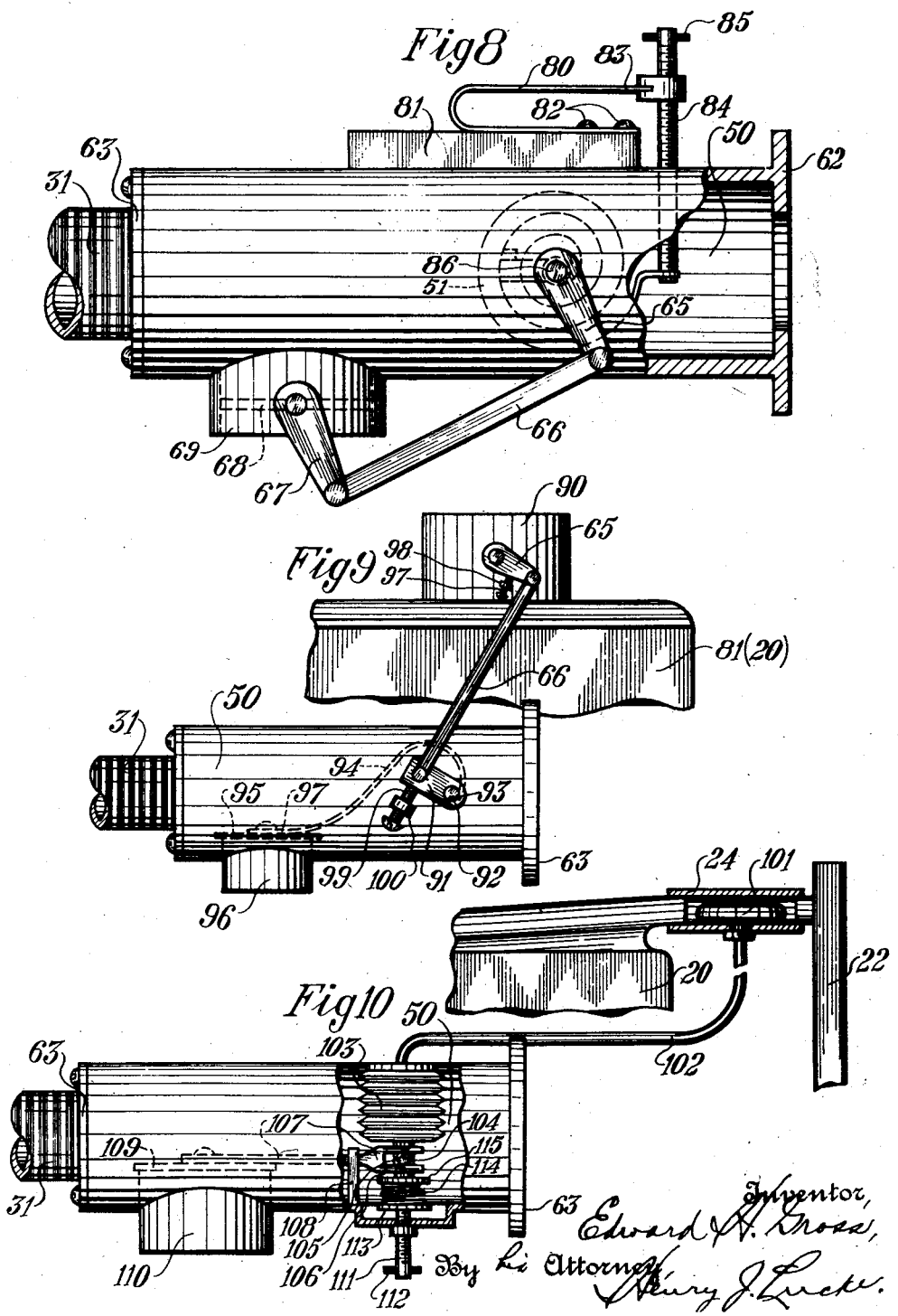

Patented Aug. 16, 1927.

1,639,032

UNITED STATES PATENT OFFICE.

EDWARD H. GROSS, OF STAMFORD, CONNECTICUT.

TEMPERATURE CONTROL OF THE AIR CONSTITUENT OF FUEL FOR EXPLOSIVE ENGINES.

Application filed January 9, 1923. Serial No. 611,565.

This invention relates to temperature control of the air or explosive mixture for explosive engines.

Heretofore it has been proposed to control the temperature of the air to carburetors of explosive engines in response to the temperature of the medium of the cooling jacket of the engine; however, such and similar arrangements have in practice proven to be ineffectual during the starting stage of the engine and as well during the running stage, by reason of the control of the air supply being unfavorably affected when the atmospheric temperature, the temperature of the pre-heated air, or both, are materially below or materially above the temperature of the atmosphere or the temperature of the pre-heated air, or both, at the time of setting such devices.

Pursuant to the present invention, the air supply to the carburetor or other mixing device for gasifying a mixture of the fuel and air is arranged to be controlled jointly in response to the temperature of the atmosphere, to the temperature of the pre-heated air and to the temperature of the engine. For such provision of means, the carburetor, which may be of the usual type or of special construction, is provided with a pipe for the supply of air leading from an air stove in heated relation with the exhaust or other heated part of the engine, and an additional air inlet provided for such air supplying pipe leading to the free atmosphere and thermostatic means responsive jointly to the temperature of the atmosphere, to the temperature of the pre-heated air and to the temperature of the engine for the full range of variation, controlling the valve of such additional air inlet, whereby under the condition of starting the engine when cold, the valve of such additional air supply inlet is maintained closed for an interval of time determined not only by the temperature of the engine during the heating-up stage but by the temperature of the pre-heated air and of the atmosphere. Pursuant to such provision of means, the air entering such additional inlet is excluded for a longer period when the temperature of the atmosphere is low, thereby permitting the air supplied by the air-stove to be delivered without lowering its temperature into the carburetor until its temperature has attained a predetermined degree corresponding to the prevailing temperature of the motor. Conversely, under the condition of high atmospheric temperature, or of high temperature of the pre-heated air, the valve of such additional air inlet is opened up at an earlier stage and the temperature of the air supplied by the air stove is correspondingly reduced.

Under the conditions of operation of my invention for the full range of atmospheric temperature and for the range of variation of temperature of the engine from starting to working temperature, the temperature of the air supplied to the carburetor is maintained for maximum explosion of the resulting gaseous mixture, irrespective of variations of temperature of the pre-heated air.

A further object of the invention is to provide simplified means for transmitting particles of liquid fuel in the passage from the carburetor to the inlet manifold of the engine into vaporized fuel whereby the mixture supplied to the inlet manifold is thoroughly vaporized and intermixed with the air at optimum temperature.

Further objects of the invention provide for improved forms of heating the air and the liquid fuel preparatory to intermixing the same; also to improved apparatus for preheating the intermixture of the vaporized fuel and supplied air; improved arrangements of the thermostatic means controlled jointly by the temperature of the atmosphere and the temperature of the pre-heated air and the temperature of the engine and further objects and features which will be more clearly understood from the following detail description and the accompanying drawings, in which—

Fig. 1 is a top plan view of a four-cylinder engine, provided with my invention; Fig. 2 is a side elevation of Fig. 1; Fig. 3 is a detail horizontal central sectional elevation of the form of joint thermostatic control device shown in Figs. 1 and 2; Fig. 4 is a sectional elevation on line 4—4 of Fig. 3; Fig. 5 is a sectional elevation on line 5—5 of Fig. 3; Fig. 6 is a detail vertical sectional central elevation of a modified form of thermostatic device; Fig. 7 is a side elevation of an engine equipped with the dual thermostatic control shown in Fig. 6; Fig. 8 is a detail vertical elevation of a further modified form of joint thermostatic control device; Fig. 9 is a detail vertical elevation of an additional further modified form of thermostatic device;

Fig. 10 is a detail vertical elevation, partly broken away, of a still further modified form of dual thermostatic device;

Figure 11:
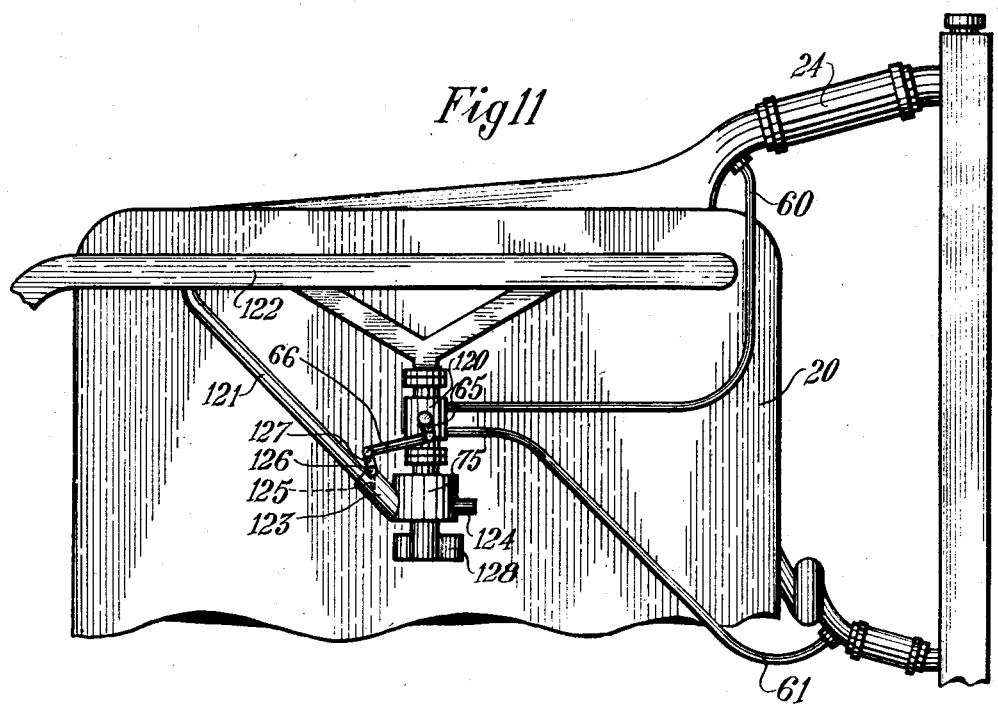
Fig. 11 is a vertical elevation of an engine block and of the radiator and radiator connections, and of the form of dual thermostatic device shown in Fig. 10.

Referring to Figs. 1, 2, and 3, the engine block of any approved type is indicated at 20, the head plate of which is shown at 21; the radiator is indicated at 22 and may be connected to the water jacket of the engine block 20 in the usual manner, as by means of the lower connection 23 for delivery of the cooling medium to the water jacket from the radiator 22 and the connection 24 for the return of the cooling medium from the radiator 22 to the water jacket. The aforesaid parts may be of the usual or approved types or of any special types applicable for use with the present invention.

The carburetor 25 of any desired type is supplied with gasolene or other liquid fuel through the pipe 26 leading from the vacuum tank 27 connected by the line pipe 28 to the gasolene tank, in the usual manner. The air inlet 29 of the carburetor 25 is connected in sealed relation with the outlet of the compartment 30, having the branch inlet pipe 31 running to an air-stove 32, located about the exhaust manifold 33 of the engine. As shown in Figs. 1 and 2, the air compartment 30 may be in the form of a casting closed at the end 34. The air compartment 30 is further provided with the branch air inlet 35 having an opening 36 leading directly to the atmosphere. The closure valve 37, see Fig. 1, controls the closing and the extents of effective opening of the air inlet 36 in response to the temperature of the atmosphere and of the temperature of the engine by a dual thermostatic control, described more fully hereinafter.

One form of the dual thermostatic control, see Figs. 1 and 3, comprises the thermostatic spiral 38 having its outer end 39 secured to the setting screw 40 having a knurled head 40ª extending through the wall 41 of the compartment 42, and its inner end 43, see Fig. 5, secured by the screw 44 to the shaft 45 mounted at one end 45ª in a suitable bearing opening 46 in the head plate 47 of the compartment 42, see Fig. 3. About the inner sides and ends of the compartment 42 is provided the jacket 48, connected in a suitable manner with the cooling system of the engine, described more fully hereinafter. The wall 49 of such jacket 48 is secured to the casing 50 enclosing the thermostat 51, see Figs. 3 and 4, responsive to the temperature of the outside atmosphere and the pre-heated air, as described more fully hereinafter. The wall 49 is further provided with a bearing opening 52 through which the shaft 45 extends and is mounted at its opposite end 45ᵇ in a bearing opening in the opposite wall of the casing 50.

The spiral 51 is secured at its inner end 53 by the screw 54 or the like to the shaft 45 and its outer end 55 is secured by the screw 56 or the like to the valve 37 controlling the atmospheric air inlet 35.

The water jacket 48 of the compartment 42 is connected at one location with the leading-in pipe 60 to the upper radiator connection 23, see Figs. 1 and 3 and at another suitable location to the leading-out pipe 61 to the lower radiator connection 24.

The end 62 of the casing 50, in which is enclosed the spiral thermostatic coupling 51 as set forth above, is connected to the inlet 29 of the carburetor 25 and the opposite end 63 may lead upwardly in connection with the piping 31, as is indicated in Figs. 1 and 2 or be connected to a heated air supply pipe 31ª with the direction of length of the casing 50, as is indicated in Figs. 3, 4 and 5.

From the foregoing, it will be observed that the temperature in the compartment 42 is regulated by the temperature of the water of the engine water-jacket passing through the jacket 48 of the compartment 42 and the thermostatic coupling spiral 38 expanded or contracted accordingly and turning the shaft 45 clockwise or counter-clockwise, as viewed in Fig. 5, correspondingly in direction and commensurately in extent of rotation. The temperature of the thermostatic coupling spiral 51 corresponds from time to time to the temperature of the air supplied by the air-stove 32 and modified to the extent of opening of the direct atmosphere inlet 35, and the thermostatic spiral 51 is expanded or contracted with corresponding rotation of its end 55 clockwise or counter-clockwise rotation, as viewed in Fig. 4, and the valve 37 elevated or depressed to varying extents commensurate to the resultant clockwise or counter-clockwise rotation of the respective thermostatic spirals 38, 51.

Pursuant to the above form of the invention as shown in Figs. 1 to 5, inclusive, upon setting the thermostatic spiral 51 and the thermostatic spiral 38 by means of the setting screw 40 to maintain the valve 37 of the direct atmospheric inlet 35 to remain closed until the optimum temperature of the air supplied through the heated air supply pipe 31, 31ª is obtained, and to open the valve 37 by the conjoint action of the thermostatic spiral 38 responsive to the temperature of the engine casing and of the thermostatic spiral 31 responsive to the temperature of the supplied air to varying extents responsive to variations of the aforesaid temperatures, the temperature of the air delivered through the outlet 62 of the compartment 50 into the inlet 29 of the carburetor 25 will be maintained at such selected optimum temperature.

The dual thermostatic control device illustrated in Fig. 6 corresponds generally to the dual thermostatic device shown in the preceding figures, and like parts are marked by the same reference numbers; however, in the arrangement shown in Fig. 6, the end 45ᶜ of the common thermostatic shaft is provided with the arm 57 carrying the setting screw 58 coacting with the abutment lug 59. At the opposite end 45ᵈ of the common shaft 45, is secured the operating lever arm 65, which is pivotally connected, see Fig. 7, to the link 66, pivoted to the arm 67 of the valve 68 in the direct-air intake 69; the air intake 69 corresponds to the air intake 49 in the aforesaid construction and the valve 68, shown of the butterfly type, corresponds to the closure valve 37 mounted directly on the end of the thermostat spiral 55 and rotative relative to the shaft 45. Also, in the construction shown in Fig. 6, the end 38ᵃ of the engine-temperature responsive thermostatic spiral 38 is fixedly secured by the screws 70 to a wall of the compartment 42.

For simplicity of inserting and installation of the thermostatic element 53 in the interior of the compartment 50, the shaft 45 may be formed of two sections removably connected to one another at or near the center as at 72, see Fig. 6, by means of the connecting screw 73.

In the modification shown in Fig. 7, the stove 74 corresponds to the stove 32 in the arrangement shown in Figs. 1 and 2. However, in the arrangement shown in Fig. 7, the thermostatic control device is positioned between the carburetor 75, of any approved or of the usual construction, and the intake 76 of the inlet manifold 77 of the engine 78. In this arrangement, the gaseous mixture formed in and delivered by the carburetor 75 to the compartment 50, see Fig. 6, encounters and directly affects the temperature of the thermostatic spiral 51 and the temperature of the thermostatic spiral 38 is controlled similarly as hereinabove set forth, by the temperature of the water of the engine water-jacket passing through the passages 60, 61 and the jacket 48 of the compartment 42 in which the thermostatic spiral 38 is enclosed.

As a result of such arrangement, the heated air delivered by the air-stove 74 passes through the heated air pipe 31 directly into the carburetor 75 and the temperature of the delivered gaseous mixture and the temperature of the engine, combinedly exerted on the control shaft 45 by the thermostatic elements 38, 51 respectively, control the extent of rotation of the operating arm 65 and therewith the extent of opening of the valve 68 in the free-air intake 69.

In Fig. 8, I have shown another form of dual thermostatic control, in which one thermostatic element 80 is mounted directly on the engine block 81, as by means of the screws 82 securing one end of the thermostatic element 80 and its free end 83 adjustably positioned on the threaded stem of the setting-screw 84 having the exteriorly extending manipulating end 85. Accordingly, the thermostatic element 80 is open to the atmosphere and jointly controlled by the temperature of the engine as conductively transmitted through the walls of the engine. The setting-screw 84 passes through a suitable opening in the wall of the compartment 50 in which the thermostatic spiral 51, controlled by the temperature of the pre-heated air, is located on a shaft 86, carrying the operating arm 65, connected at its free end by the link 66 to the arm 67 of the valve 68 in the free-air intake 69. Such form of dual thermostatic arrangement may be employed either in the particular relation shown in Figs. 1 and 2 or that shown in Fig. 7.

In the form of the thermostatic control shown in Fig. 9, the spiral located directly on the engine block or on a bracket 81 directly connected to the engine block or as hereinabove set forth subjected to substantially the temperature of the engine or of the cooling medium of the engine, is enclosed in the casing 90 and mounted similarly as the thermostatic element 38 as shown in Fig. 6 and is provided with a similar operating arm 65 connected by the link 66 to the operating arm 91 secured to the shaft 92, fixedly carrying the end 93 of the coiled thermostatic element 94. The closure valve 95 of the direct air inlet 96 is movably carried by the free end 97 of the thermostatic element 94, similar to the arrangement shown in Figs. 3 and 4, in respect to the thermostatic element 51 and the closure valve 37 controlled thereby. The arm 65 of the upper thermostatic element is provided with the adjustable limit stop comprising the setting screw 97 passing through the threaded opening of the lug 98, and an adjustable setting stop is provided for the arm 91 of the lower thermostatic element 94 comprising the set screw 99 passing through the threaded opening of the lug 100. In this arrangement, the thermostatic element responsive to the temperature of the engine is set to begin the movement of its arm 65 away from the setting screw 97 at a predetermined temperature of the air passing through the passage 31 from the air stove, as hereinabove set forth, into the compartment 50 in which the thermostatic element 94 is enclosed, and the setting screw 99 is adjusted so that the operating arm 91 of the thermostatic element 94 begins its movement from the setting screw 99 at the temperature of the heated air supplied to the interior of the compartment 50 at which the valve 95 of the direct air inlet 96 is desired to begin its opening movement.

In the arrangement shown in Fig. 10, the conjoint multiple temperature control comprises a hollow casing 101 of thin metal or the like, located in the coupling 24 connecting the outlet of the cooling jacket of the engine 20 to the radiator 22 which casing 101 contains temperature-responsive fluid of the usual or any approved type and flowing through the pipe 102 connecting the casing 101 with the temperature-expansible chamber 103 of the usual or any approved form, mounted in the compartment 50, the compartment 50 is connected at its end 63 to the inlet 29 of the carburetor 25, similarly as hereinabove set forth. The opposite end 63 of the compartment 50 is connected by the pipe 31 to the hot-air stove, also similarly as hereinabove set forth. The stem 104 at the movable end of the temperature-expansive chamber 103 is provided with the pin 105 located within the fork 106 of the lever 107 pivoted on the fulcrum lug 108 and carrying at its free end the valve 109 controlling the extent of opening of the inlet 110 leading directly to the free air. The stem 104 is adjusted by means of the set-screw 111 having the exterior finger piece 112 and carrying at its inner end the cup 113 guiding and to which one end of the spiral expansion spring 114 is secured, the opposite end of the spring 114 being connected to and guided within the upper cup 115, located for contact with the end of the stem 104 of the expansible chamber 103. Accordingly, the temperature responsive fluid is subjected jointly within the casing 101 to the temperature of the cooling medium of the engine and within the expansive chamber 103 to the temperature of the air supplied by the hot-air stove modified by the temperature of the free air regulated by the valve 109.

In Fig. 11 I have shown another form of the invention and comprising the temperature responsive device 120 which may be of the form as shown in Fig. 6, and like parts are indicated by the same reference numbers. Specifically the link 66 controlled by the operating arm 65 of the shaft common to the thermostatic element respectively responsive to the temperature of the cooling medium of the engine and to the temperature of the explosive medium, may be supplied by the carburetor 75. However, in the arrangement shown in Fig. 11, the pipe 121 is connected to the exhaust manifold 122 and is of relatively materially less cross sectional area than the exhaust pipe 122, which pipe 121 leads to the compartment 123 surrounding the carburetor proper 75 and opens out to the atmosphere at 124. In the compartment 123 is provided the pivoted valve 125 mounted on the shaft 126 to which is fixed the operating arm 127, pivotally connected to the link 66 controlled by the aforesaid pair of thermostatic elements corresponding to the thermostatic elements 38, 53, as shown in Fig. 6. However, in the arrangement shown in Fig. 11, the air inlet 128 of the carburetor proper 75 may open directly to the atmosphere, that is to say, the air supplied to the carburetor need not be preheated by hot-air stove or equivalent.

In the arrangement shown in Fig. 11, the valve 125 is set to fully open position for "cold" temperature of the engine, that is to say, that of the temperature of the atmosphere, and the valve 25 gradually closed upon modification of the temperature of the engine from atmospheric temperature to its fully working temperature and the corresponding rise in temperature of the explosive mixture supplied by the carburetor 75 theretofore preheated by the portion of the exhaust gases passing through the piping 121, 123, 124. Such arrangement provides for heating of the carburetor by the exhaust gases substantially immediately after starting the engine and in effecting the gradual diminution of such preheating of the carburetor as the temperature of the engine approaches its normal working temperature.

Figure 12:
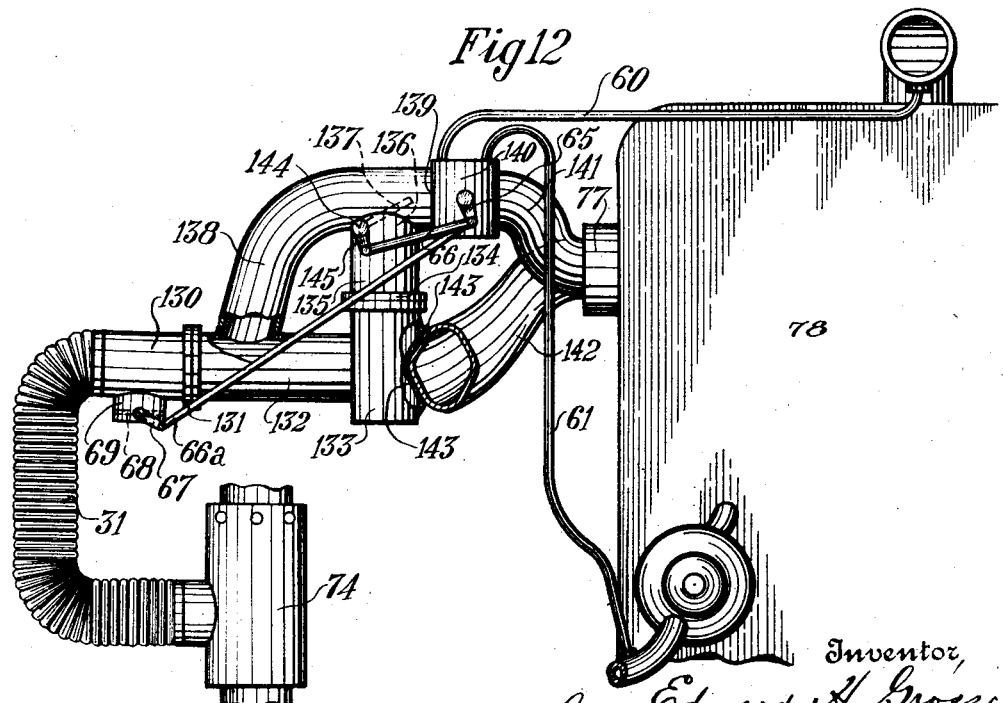
Fig. 12 is a rear elevation of an engine block, and thermostatic control of the gaseous mixture supplied by the carburetor to the inlet manifold.

In the modification of the invention shown in Fig. 12, the air inlet of the carburetor 130 is connected to a piping leading to an air stove as heretofore set forth or leading directly to the atmosphere and the outlet 131 of the carburetor is connected to the chamber 132 connected at one end to the vaporizing compartment 133, the outlet 134 of which communicates with the pipe 135; the outlet 136 of the pipe 135 is controlled by the valve 137. At a point located between the outlet 131 of the carburetor 130 and the vaporizing compartment 133, is connected the upwardly extending by-pass 138 communicating with the outlet 136 of the pipe 135. The outlet 139 of the pipe 138 communicates with the chamber of the conjoint thermostatic device 140 corresponding to the thermostatic device shown in Fig. 5, and the outlet of the thermostatic device 140 communicates with the pipe 141 leading to the inlet manifold 77 of the engine 78, similarly as in Fig. 7. However, in the arrangement shown in Fig. 12, the vaporizing compartment 133 is brought in heated relation with the exhaust pipe 142 of the engine 78 and the effective area of heating surface is enlarged by the provision of the curved wall 143 of the vaporizing compartment 133. The valve 137 is shown pivotally mounted on its shaft 144 to which is fixed the operating arm 145 connected to the link 66 of the operating arm 65 of the conjoint temperature device 140. In this arrangement, the thermostatic elements for "cold" temperature of the engine 78 and initial operation of the carburetor 131, is set to hold the valve 137 in fully closed position, and accordingly in such initial stage of starting the engine, communication between the carburetor 130 and the engine inlet manifold 77 is attained solely through the piping 138, 141 and the valve 137 is held in closed position to preclude the entry of any incompletely vaporized or nonintermingled mixture which has attained the compartment 133. Such provision of means ensures the delivery from the carburetor to the engine inlet manifold solely of fully vaporized fuel, intermixed with air and all partially vaporized or liquid particles of the fuel passing out of the outlet 131 of the carburetor 130 will be delivered to the compartment 133. Upon elevation of the temperature of the exhaust passage 142, which rises at a rapid rate until the range of maximum temperature is attained, and upon elevation of the engine temperature, the thermostatic element corresponding to the element 38, see Fig. 6, is raised in temperature causing or tending to cause the valve 137 to begin its movement of opening. When the carburetor 130 is supplied with air preheated by an air-stove, as heretofore set forth, the explosive mixture passes through the chamber of the thermostat control device 140 corresponding to the chamber 50, see Fig. 6, and elevates the temperature of the thermostatic element 51, thereby augmenting the rate of rise of temperature of the thermostatic device 140 and advancing the instant of opening and the rate of the extent of opening of the valve 137. Upon such increase in temperature of the exhaust 142 and the resulting increase in temperature of the compartment 133, the liquid or unvaporized particles of fuel contained therein are vaporized to greater and greater extent until the temperature of the compartment 133 attains its predetermined maximum temperature, at which stage the valve 137 of the outlet 136 of the vaporized chamber 133 will have been moved to fully open position. If desired, the valve 137 in its fully open position of the outlet 136 may serve to fully close the passage 138.

In the arrangement shown in Fig. 12, the carburetor 130 is preferably provided with an air inlet communicating through a passage 31 with an air-stove 74, as is shown in Fig. 7 and similarly as in Figs. 1 and 2, and such passage 31 is provided with an inlet 69 communicating directly with the atmosphere; such direct air inlet 69 controlled by a valve 68 in instant of opening and extent of opening by similar connection 66* with the operating arm 65 of the thermostatic control device 140 simultaneously with the control of the valve 137 in the outlet 136 of the vaporizing compartment 133.

From the above it will be perceived that the temperature of the explosive mixture delivered to the engine inlet is controlled in response to the temperature of the engine and to the temperature of the atmosphere. Such control is effected either by controlling the temperature of the air entering the carburetor or by controlling the heating of the carburetor by exterior heating means and the regulation of the same is effected by locating a thermostatic element either in the path of the preheated air in advance of the carburetor or in the path of the explosive mixture in advance of entry into the engine cylinders.

In the instances where an air stove is heated by the exhaust, the temperature of the air stove varies through the range of variation of the exhaust, that is to say, depending upon the advance or the retardation of the spark lever; if desired the air stove may be positioned in heated relation to a portion of the water jacket of the engine or like part thereof to maintain substantially constant temperature of the air-stove during the operation of the engine.

It will also be noted that the optimum temperature of the air in advance of the carburetor or the optimum temperature of the gaseous mixture in advance of entry into the engine inlet, and the volumetric efficiency of the resulting gaseous mixture, is maintained irrespective of variations of temperature of the motor.

Such improved results are enhanced by the preclusion of un-mixed fuel from the engine cylinders under thermostatic control.

Whereas, I have described my invention by reference to specific forms thereof it will be understood that many changes and modifications may be made without departing from the spirit of the invention.

I claim:

1. The combination with an explosive engine, of a fuel supply passage, a carburetor having an air inlet, means connecting said fuel supply on said carburetor and means for controlling the temperature of the explosive medium supplied by said carburetor to said engine, said controlling means being responsive to the temperature of the supplied air and to the temperature of the engine.

2. The combination with an explosive engine, of a fuel supply passage, a carburetor having an air inlet, air preheating means in heating relation to a heated portion of said engine, a passage connecting said air preheating means with said air inlet, said passage having an inlet leading directly to the atmosphere, a valve regulating the entry of air through said direct air inlet and means for controlling said valve in response to the temperature of the supplied air and to the temperature of said engine.

3. The combination with an explosive engine, of a fuel supply passage, a carburetor having an air inlet, air preheating means in heating relation to a heated portion of said engine, a passage connecting said air preheating means with said air inlet, said passage having an inlet leading directly to the atmosphere, a valve regulating the entry of air through said direct air inlet and means for controlling said valve in response to the temperature of the supplied air and to the temperature of said heated portion of the engine.

4. The combination with an explosive engine, of a fuel supply passage, a carburetor having an air inlet and adjustable means for controlling the temperature of the supplied explosive medium, said controlling means being responsive to the temperature of the supplied air and to the temperature of the engine.

5. The combination with an explosive engine, of a fuel supply passage, a carburetor having an air inlet and means connecting said fuel supply on said carburetor, of adjustable means for controlling the temperature of the explosive medium supplied by said carburetor to said engine, said controlling means being responsive to the temperature of the supplied air and to the temperature of the engine.

6. The combination of an explosive engine, a fuel supply passage, a carburetor having an air inlet, air pre-heating means in heating relation to a heated portion of said engine, a passage connecting said air preheating means with said air inlet, said passage having an inlet leading directly to the atmosphere, a valve regulating the entry of air through said direct air inlet and adjustable means for controlling said valve in response to the temperature of the supplied air and to the temperature of said engine.

7. The combination of an explosive engine, a fuel supply passage, a carburetor having an air inlet, air preheating means in heating relation to a heated portion of said engine, a passage connecting said air preheating means with said air inlet, said passage having an inlet leading directly to the atmosphere, a valve regulating the entry of air through said direct air inlet and adjustable means controlling said valve in response to the temperature of the supplied air and to the temperature of said heated portion of the engine.

In testimony whereof I have signed this specification this 20th day of December, 1922.

EDWARD H. GROSS.